United States Patent [19]

Sekmakas et al.

[11] 3,879,340

[45] Apr. 22, 1975

[54] COATING COMPOSITIONS CONTAINING SURFACE ACTIVE ADDITION POLYMERS

[75] Inventors: Kazys Sekmakas, Chicago; Robert O. Yates, Arlington Heights, both of Ill.

[73] Assignee: DeSoto Inc., Des Plaines, Ill.

[22] Filed: Nov. 9, 1970

[21] Appl. No.: 88,251

[52] U.S. Cl.... 260/40 R; 260/31.2 XA; 260/32.8 R; 260/33.2 R; 260/33.4 R; 260/33.6 UA; 260/837 R; 260/844; 260/850; 260/862
[51] Int. Cl.......................... C08f 43/08; C08f 45/34
[58] Field of Search..................... 260/862, 901, 851

[56] References Cited
UNITED STATES PATENTS

| | | | |
|---|---|---|---|
| 3,163,615 | 12/1964 | Sekmakas | 260/22 CB |
| 3,407,160 | 10/1968 | Frank | 260/28 |
| 3,449,468 | 6/1969 | Vrotney | 260/862 |

*Primary Examiner*—Joseph L. Schofer
*Assistant Examiner*—Paul R. Michl
*Attorney, Agent, or Firm*—Dressler, Goldsmith, Clement & Gordon, Ltd.

[57] ABSTRACT

Solvent solution coating compositions containing resin vehicles which exhibit poor flow and wetting characteristics are modified to improve these characteristics without significantly altering the overall nature of the resin vehicle by the addition of a small amount of a surface active addition polymer consisting essentially of (1) monoethylenic ester having a straight chain saturated aliphatic terminal hydrocarbon group containing at least 4 carbon atoms, and (2) monoethylenic ester having a branched chain terminal hydrocarbon group.

4 Claims, No Drawings

COATING COMPOSITIONS CONTAINING SURFACE ACTIVE ADDITION POLYMERS

The present invention relates to organic solvent solution coating compositions containing a small proportion of a surface active polymer which improves the capacity of the resin vehicle to wet the pigment and to flow and facilitate the elimination of surface defects in the coating.

Organic solvent solution coating compositions used for industrial coatings are subject to numerous inadequacies such as cratering, foaming, blistering, and the like, they are quite sensitive to foreign contaminants which are frequently present on the substrate being coated, and they tend to flow poorly causing crawling and wrinkling. These defects are particularly difficult in thermosetting coating systems where the full resinification of the system takes place on the substrate during a cross-linking cure when the coated substrate is baked to remove the organic solvent and induce the curing reaction to take place.

Still another defect is the inability of the vehicle to wet pigments and especially metallic pigments so that the desired metallic sheen is not obtained. A feature of the invention is the improved wetting of metallic pigments without inducing blistering.

In the past, the polymers used in coating compositions were formulated to balance the hardness, and flexibility and cure characteristics of the coating. Aspects of flow and pigment wetting were given secondary consideration, and flow control agents were used in an effort to enhance these factors, but with only modest success. When the polymer used to provide the resin vehicle was modified in an effort to enhance surface properties, then the primary coating characteristics were thrown out of balance.

More particularly, one cannot significantly change the nature and balance of the components of the resin vehicle since this would destroy the desired final properties of the coating. However, when surface active materials, and especially silicones, are used to improve the wetting and flow characteristics, then a pronounced tendency toward blistering and foaming results. This difficulty of blistering, foaming, solvent popping and allied disturbances are particularly distressing in thermosetting systems where the cure tends to trap the solvent within the coating.

The present invention is based on the finding that a very small amount of an added polymer can completely alter the surface characteristics of the system and, by properly balancing the lipophilic and lipophobic content of the added polymer, the coating system can be vastly improved in its capacity to wet the pigments and the base and to flow properly while avoiding any tendency to induce blistering or cratering. Moreover, this can be accomplished without degrading the overall characteristics of the coating.

In accordance with the invention, there is included in the coating composition from 0.01 to 5%, preferably from 0.05 to 3%, and most preferably from 0.5 to 2%, based on the weight of the resin vehicle, of a surface active addition polymer consisting essentially of monoethylenic ester having a long straight chain saturated aliphatic terminal hydrocarbon group and monoethylenic ester having a branched chain terminal hydrocarbon group, the weight ratio of these two component being in the range of from 90:10 to 10:90. When the straight chain ester contains less than 8 carbon atoms in the terminal group, then more of this component is needed, usually at least 20% by weight of the mixture of two essential components.

It is desired to point out that the mixtures specified are essential. When a polymer consisting of short chain esters is used, such as polyethyl acrylate, then the wetting and flow characteristics are not significantly benefitted. When a polymer consisting of long chain esters is used, then various difficulties are encountered. Thus, polystearyl methacrylate and polylauryl methacrylate are not even compatible with the resin vehicle. When branched chain esters are used alone, such as polyisobutyl acrylate or 2-ethylhexyl acrylate, then excellent wetting and flow are obtained at the expense of very poor blistering, foaming and solvent release. When a portion of the branched chain esters is selected to possess 10 carbon atoms or more in the terminal hydrocarbon group, then the blistering and foaming defect is minimized, providing a less preferred, but sometimes satisfactory alternative. Here, a major weight proportion of branched chain ester having from 4–8 carbon atoms in the terminal chain is combined with a minor weight proportion of branched chain ester having more than 10 carbon atoms in the terminal chain.

It is not possible to employ short chain esters to modify the other type of esters. Thus, if ethyl acrylate is used to modify the characteristics of isobutyl acrylate, and if enough ethyl acrylate is used to overcome blistering, then the wetting and flow characteristics are degraded. Similarly, if ethyl acrylate is used with a long chain acrylate then, again, the wetting and flow characteristics are not acceptable.

Curiously, when long straight chain esters are used in combination with branched chain esters in the proportions noted, then the mixture provides superior wetting and flow without inducing blistering, foaming and the like and, in the small amounts used, the overall coating characteristics are unchanged.

It should be observed that the longer the chain length of the straight chain ester, the less can be tolerated before compatibility difficulties are experienced. On the other hand, and while the bulk of the polymer must be selected from the classes identified, small amounts of other monoethylenic material can be incorporated into the polymer, particularly short chain esters and aromatic vinyl compounds, up to a maximum of 25%, but preferably not in excess of 15%, in order to enhance compatibility without losing desired wetting and flow characteristics, and thereby increase the proportion of long straight chain ester which can be tolerated without compatibility difficulties.

Referring more particularly to the monoethylenic ester having a long straight chain saturated aliphatic terminal hydrocarbon group, the preferred compounds of this class are esters of an alkanol with a monoethylenically unsaturated carboxylic acid, preferably a monoethylenic acid such as acrylic or methacrylic acid. However, other esters can be used such as esters of itaconic acid, crotonic acid, maleic acid or fumaric acid. The long straight chain saturated aliphatic terminal hydrocarbon group should include at least 4 carbon atoms and may, thus, be constituted by butyl, amyl, hexyl, octyl, decyl, lauryl or stearyl and the like. The upper limit of chain length would appear to be dictated solely by compatibility, but would not normally exceed 18 carbon atoms. Typical compounds of the class noted are butyl acrylate, butyl methacrylate, lauryl methacrylate, stearyl methacrylate, decyl acrylate and the like. Others esters which might be used are illustrated by dibutyl maleate, lauryl crotonate, dioctyl maleate and dioctyl fumarate. Still other compounds of the type under consideration which may be used are vinyl hexoate and vinyl stearate.

The monoethylenic esters having a branched chain terminal hydrocarbon group are, again, preferably esters of an alkanol with a monoethylenic unsaturated carboxylic acid, the same acids noted before being useful here. Thus, typical compounds are isobutyl acrylate, 2-ethylhexyl acrylate and isoamyl acrylate. Other typical esters are illustrated by isopropyl acrylate, isopropyl methacrylate, neopentyl acrylate, neopentyl methacrylate, etc.

It is desired to point out that resin vehicles which deposit industrial coatings possessing reasonable hardness and flexibility frequently exhibit poor flow and wetting characteristics. These characteristics are easily noted, when the resin vehicle is used without extraneous agents and in the absence of this invention, by noting that the surface of the coating is defective, even when the base is entirely covered and there are no defects visible to the eye. However, when the surface is viewed under a microscope at 50 magnifications, it can be seen that the surface is covered with microscopic ridges arranged in swirls, a defect known as "vortexing." When the surface active addition polymers of the invention are added in the proportions described, then these microridges are eliminated.

Conventional flow control agents are able to minimize this microridging problem to an extent, but their use frequently leads to considerable blistering. In some instances, and when observable blisters are not apparent, there are still pinholes formed which can be seen under a microscope. Moreover, the use of conventional flow control agents does not improve pigment wetting as evidenced by the fact that the brightening effect of metallic pigments is not realized.

While the bulk of the surface active polymer must be selected in the manner noted, small proportions of the polymer may be constituted by diverse materials. Thus, shorter chain esters such as methyl methacrylate, ethyl methacrylate, propyl methacrylate may be used. Other diverse components may also be present such as small proportions of acrylic acid or the like; or hydroxy ethyl methacrylate or the like may be included since these are not particularly lipophilic and are helpful to facilitate compatibility. The preferred materials constituting any small balance of the surface active polymer are esters of monoethylenic monocarboxylic acids with ethyl alcohol, propyl alcohol or isopropyl alcohol; and up to 10% of the copolymer may be constituted by a monoethylenic carboxylic acid or by an hydroxy functional monoethylenic monomer such as hydroxy ethyl methacrylate or hydroxy propyl methacrylate, or an allyl alcohol such as allyl alcohol or methallyl alcohol. While these diverse extraneous components are helpful in small amounts, they are less necessary when the two main components are used in a weight ratio of from 25:75 to 75:25, or when the straight chain ester contains at least 8 carbon atoms in the terminal group and is used in a minor weight proportion.

The preferred thermosetting coating systems under consideration may be of diverse type, but are preferably constituted by either a methylolated acrylamide-containing interpolymer containing from 3–40% of methylolated acrylamide or methylolated methacrylamide or the like or by a mixture of an hydroxy functional interpolymer such as a copolymer of styrene and allyl alcohol or a copolymer containing hydroxy ethyl methacrylate containing from 3–40% of copolymerized hydroxy monomer blended with an aminoplast resin such as urea or melamine-formaldehyde. The aminoplast resin would normally constitute from 3–50% of the blend. The non-functional monomer content of the various interpolymers which may be used is wholly conventional, being selected to provide the balance of hardness and flexibility which is desired. The only difficulty is that normal selection for industrial coating purpose leads to poor flow and wetting and inadequate wetting of pigments as has been explained.

Cratering and flow control problems are troublesome in diverse thermosetting coating systems and the invention is generally applicable to correct these defects. Among the systems warranting mention are: varnishes comprising heat-reactive phenol-formaldehyde condensates; carboxy-functional copolymers cured with polyepoxides such as a copolymer of 60% styrene, 32% ethyl acrylate and 8% acrylic acid cured with 5–20% of a bisphenol A diglycidyl ether having a molecular weight of from 350–1,000; oil-free, hydroxy-functional polyester resins such as those disclosed in U.S. Pat. No. 3,450,792 cured with aminoplast resin; and trimellitic anhydride-based acidic polyester resins cured with aminoplast resins.

Solvent selection is of very secondary consideration in the present invention, typical solvents being aromatic solvents such as xylene in admixture with alcoholic solvents such as butanol, 2-ethoxy ethanol, or the like. Other appropriate solvents are ketones such as methyl ethyl ketone and butyl acetate. The solvent solutions which are typically applied are relatively concentrated, e.g., they contain, on a pigment free basis, from 30–65% by weight of resin solids.

As should be evident, this invention applies to coatings which are both pigmented and clear, but it is of especial value to pigmented systems in which the pigment includes a metallic pigment.

While we can add the surface active polymer to the finished paint, especially when the major problem is inadequate surface properties, still, thermosetting paints, and especially thermosetting acrylics are known to be poor wetting polymers such that the dispersing of the pigments into the resin solutions is difficult, consuming many hours of dispersing time (frequently more than four hours and sometimes more than eight hours). In such instance, the surface active polymer is added to the pigment rich paste so that dispersing time is greatly reduced. Dispersing of a pigment paste in the vehicle is normally carried out in a ball mill, or in a sand mill, or in a high speed blade disperser. The invention is helpful to reduce dispersion time regardless of the equipment selected.

With easy dispersing pigments such as flake aluminum, the surface active polymer can be added before or after dispersion of the flakes in the vehicle. However, in many instances, dispersing difficulties are encountered and, here, having the surface active polymer present during dispersion is helpful. Organic pigments such as phthalocyanine blue or green illustrate particularly difficult pigments to disperse. Carbon black and bone black are also quite hard to disperse.

Another feature of this invention is surface lubricity. For some reason not fully apparent, the surface active polymer concentrates at the surface without degrading overall properties, while still conferring new and additional properties. One of these new characteristics is surface lubricity which contributes marproofness and aids fabrication of the coated base after cure. Normally, waxes are added for this purpose. However, waxes can be harmful by causing surface imperfections and by blooming excessively to produce a hazy surface. This invention reduces the need for waxes and, sometimes, the wax can be completely eliminated, as in the metallic system illustrated hereinafter which normally requires wax.

EXAMPLE 1

A typical thermosetting coating composition providing excellent hardness and flexibility, but which exhibits poor resistance to contamination, only fair flow and leveling characteristics, excellent blister resistance, but poor capacity to wet metallic pigments, is provided as follows.

| Resinous Vehicle (Component) | Weight Percent |
|---|---|
| Acrylamide (subsequently methylolated) | 8 |
| Ethyl Acrylate | 49.2 |
| Unsaturated Polyester | 20 |
| Styrene | 17 |
| Methyl Methacrylate | 5 |
| Glacial Methacrylic Acid | 0.8 |
| | 100.0 |

The unsaturated polyester in the above composition is provided by charging into a reactor equipped with an agitator, heating mantle, Dean-Stark trap, thermometer and nitrogen inlet tube, 790 grams of dehydrated castor oil fatty acids, 250 grams of crotonic acid, 785 grams of glycerine and 400 grams of isophthalic acid. Add 50 grams of xylol as reflux solvent. Heat to 420°F. and hold for acid value of 5.0. Cool to 380°F. and add 240 grams of a technical grade of 1,1'-isopropylidenebis (p-phenyleneoxy)di-2-propanol, 160 grams of phthalic anhydride and 255 grams of azelaic acid. Heat to 420°F. and hold for an acid value of 13–15. Add 510 grams of butyl alcohol to provide a solution containing 80% solids. The final characteristics of the polyester resin are:

| Solids (percent) | 79.5 |
|---|---|
| Viscosity (Gardner) | V-W |
| Color (Gardner) | 3–4 |

The listed components were copolymerized and subsequently methylolated as described in U.S. Pat. No. 3,163,615 to Kazys Sekmakas, granted 12/29/64.

A coating composition utilizing the interpolymer produced hereinbefore to provide a gloss coil coating is produced as follows.

The coating enamel is prepared using 4.5% of a metallic pigment with the resin of this example being thinned to 57% solids using an aromatic hydrocarbon solvent having a boiling range of 375°–410°F. The enamel solution has incorporated therein a copolymer of 70% isobutyl acrylate and 30% stearyl methacrylate (see Example 1A) in an amount of 1% by weight, based on the weight of the interpolymer. The pigment used is non-leafing aluminum pigment in an amount of 4.5%, based on the weight of resin solids, to provide the desired metallic sheen. The surface active polymer is preferably added to the aluminum paste which is supplied as a 65% solids paste in mineral spirits. The surface active polymer is added together with solvent (nitropropane) to thin the paste to a 35% solids slurry. This slurry disperses easily in the vehicle by simple mixing.

Drawdowns of the enamel are made on aluminum panels to provide a coating thickness of about 1 mil. The coatings are cured in a gas fired oven for 60 seconds at 525°F.

The coatings exhibit excellent flow and wetting characteristics and the films are free of pin holes and craters, as well as blisters. Microscopic examination of the cured films at 50 magnifications shows that the swirling patterns of microridges (vortexing) has been avoided. The cure used is a minimum bake, but the films cure excellently to resist 50 double rubs with a methyl ethyl ketone-saturated cloth. The cured films exhibit superior gloss (60° Glossmeter of 93 and a rich and deep surface. The films have excellent flexibility (pass 40 lbs. reverse impact on 19 gauge aluminum) despite a pencil hardness of F–H. Also, the cured surface resisted fingernail scratching despite the absence of wax in the coating and has good blocking resistance (pass 130° F. at 4 p.s.i.).

In contrast with the results obtained herein by the inclusion of 1% by weight of a copolymer of 70% isobutyl acrylate and 30% stearyl methacrylate, the absence of this component produces a coating which is dull gray in appearance, possessing no brightness or hide and which exhibits a 60° Gloss reading of only 65. In addition, the surface exhibits vortexing (swirls of microridges at 50 magnifications), and the flow and wetting characteristics are marginal, leading to failure when the surface coated becomes somewhat contaminated. Also, fingernail scratching marred the surface. However, pencil hardness, flexibility, blocking resistance and solvent insolubility were the same as when the surface active polymer was present.

EXAMPLE 1-A

Procedure for the Preparation of Surface Active Polymers 330 parts by weight of 2-ethoxy ethanol are added to a reactor and heated to 135° C. using agitation and nitrogen sparge. 700 parts by weight of isobutyl acrylate, 300 parts by weight stearyl methacrylate and 10 parts by weight of di-tertiary butyl peroxide are mixed together and added to the reactor over a 2 hour period while maintaining the temperature at 130°–135° C. This temperature is held for 1 hour after addition is completed and 4 parts by weight of di-tertiary butyl peroxide are added. Hold for an additional 2 hours at 135° C. and cool. The final characteristics of the surface active polymer are:

| Solids (percent) | 74.8 |
|---|---|
| Viscosity (Gardner-Holdt) | U-V |
| Color (Gardner) | 1 |

Beneficial results are obtained utilizing other combinations of monomers in Example 1 as noted below.

The following surface active polymers were prepared using the procedure of Example 1-A.

| | Monomer and Percent of Use | Solids % | Viscosity Gardner-Holdt | Film Brightness | Performance Flow & Wetting | Blister Resistance |
|---|---|---|---|---|---|---|
| 1. | 50% Isobutyl Acrylate<br>50% Butyl Acrylate | 74.6 | U-V | Fair | Good | Fair |
| 2. | 70% Isobutyl Acrylate<br>30% Lauryl Methacrylate | 74.2 | V | Excellent | Excellent | Very Slight |
| 3. | 80% Isobutyl Acrylate<br>20% Isodecyl Methacrylate | 74.5 | X-Y | Excellent | Excellent | Poor (marginal) |
| 4. | 50% 2-Ethylhexyl Acrylate<br>50% Lauryl Methacrylate | 74.5 | V | Fair | Very Good | Good |
| 5. | 70% Isobutyl Acrylate<br>30% Isodecyl Methacrylate | 75.5 | X-Y | Excellent | Excellent | Poor (marginal) |
| 6. | 65% 2-Ethylhexyl Acrylate<br>35% Stearyl Methacrylate | 75.8 | N-O | Good | Very Good | Very Good |
| 7. | 50% 2-Ethylhexyl Acrylate<br>48% Butyl Acrylate<br>2% Methacrylic Acid | 75.0 | U-V | Fair | Good | Fair |
| 8. | 50% 2-Ethylhexyl Acrylate<br>45% Butyl Acrylate<br>5% Hydroxy Ethyl Methacrylate | 75.5 | T-U | Fair | Good | Fair |
| 9. | 60% Isobutyl Acrylate<br>10% Styrene<br>30% Stearyl Methacrylate | 73.4 | $Z_4$ | Excellent | Excellent | No Blisters |

In the above table, it will be seen that Polymers 3 and 5 employ a minor proportion of branched chain monomer of very long chain length. As a result, blister resistance is poor, but in some instances, involving slow line speed and the like, the poor but marginal blister resistance may be tolerated. However, in the absence of the isodecyl methacrylate component, the blister resistance is quite bad and unacceptable.

The invention is defined in the claims which follow. We claim:

1. An organic solvent solution thermosetting coating composition comprising organic solvent which is removed when the coating is deposited and baked, said solvent having dissolved therein a resin vehicle comprising a methylolated acrylamide-containing interpolymer and which exhibits poor flow and wetting characteristics evidenced by the deposition of a film which, after baking, contains microscopic surface ridges visible under a microscope at 50 magnifications, said coating composition including from 0.01 to 5%, based on the weight of the resin vehicle, of a surface active addition polymer consisting essentially of (1) monoethylenic ester having a straight chain saturated aliphatic terminal hydrocarbon group containing at least 4 carbon atoms, and (2) monoethylenic ester having a branched chain terminal hydrocarbon group, the weight ratio of these two components being from 90:10 to 10:90, whereby the overall properties of the coating are determined by the characteristics of the said resin vehicle and the flow and wetting characteristics of the coatings are determined by said surface active addition polymer.

2. A pigmented organic solvent solution thermosetting coating composition comprising organic solvent which is removed when the coating is deposited and baked, said solvent having dissolved therein, on a pigment free basis, from 30–65% by weight of a thermosetting resin vehicle selected from the group of methylolated acrylamide containing interpolymers and hydroxy functional interpolymers blended with an aminoplast resin, said resin vehicle exhibiting poor flow and wetting in the absnece of added flow control agent, said coating composition including, in compatible admixture with said resin vehicle, from 0.05 to 3% based on the weight of the resin vehicle, of a surface active addition polymer consisting essentially of (1) monoethylenic ester having a straight chain saturated aliphatic terminal hydrocarbon group containing at least 4 carbon atoms, and (2) monoethylenic ester having a branched chain terminal hydrocarbon group, the weight ratio of these two components being from 90:10 to 10:90, other monoethylenic material being present in said polymer in an amount of from 0 to 15%, whereby coatings which thermoset can be applied in the absence of the poor flow and wetting characteristics normally associated with said coatings.

3. A coating composition as recited in claim 2 in which the said components (1) and (2) of said surface active addition polymer are utilized in a wiight ratio of from 25:75 to 75:25.

4. A coating composition as recited in claim 2 in which the pigment of said coating composition comprises non-leafing aluminum pigment.

* * * * *